United States Patent
Xu et al.

(10) Patent No.: US 6,168,048 B1
(45) Date of Patent: Jan. 2, 2001

(54) METHODS AND SYSTEMS FOR DISTRIBUTING LIQUID CHEMICALS

(75) Inventors: Mindi Xu, Naperville; Xavier Vigor, Chicago, both of IL (US)

(73) Assignee: American Air Liquide, Inc., Walnut Creek, CA (US)

(*) Notice: Under 35 U.S.C. 154(b), the term of this patent shall be extended for 0 days.

(21) Appl. No.: 09/158,740

(22) Filed: Sep. 22, 1998

(51) Int. Cl.[7] .................................................. G01F 11/00
(52) U.S. Cl. ................................ 222/1; 222/61; 222/64; 222/318; 222/386.5; 222/399
(58) Field of Search .................................. 222/1, 61, 64, 222/135, 189.06, 318, 386.5, 399

(56) References Cited

U.S. PATENT DOCUMENTS

| | | | |
|---|---|---|---|
| 4,524,801 | 6/1985 | Magnasco et al. | 137/567 |
| 5,148,945 | 9/1992 | Geatz | 222/1 |
| 5,330,072 | 7/1994 | Ferri, Jr. et al. | 222/1 |
| 5,370,269 | 12/1994 | Bernosky et al. | 222/61 |
| 5,411,179 | * 5/1995 | Oyler et al. | 222/386.5 |
| 5,417,346 | 5/1995 | Ferri, Jr. et al. | 222/61 |
| 5,570,815 | 11/1996 | Ramsay | 222/95 |
| 5,573,646 | 11/1996 | Saito et al. | 204/266 |
| 5,609,191 | * 3/1997 | Topping et al. | 222/318 |
| 5,641,895 | 6/1997 | Grant | 73/64.56 |
| 5,678,771 | 10/1997 | Chapman | 239/727 |
| 5,722,447 | 3/1998 | Morgan et al. | 137/1 |
| 5,887,752 | * 3/1999 | Strother | 222/399 |
| 5,899,367 | * 5/1999 | Strength et al. | 222/61 |

FOREIGN PATENT DOCUMENTS

| | | | |
|---|---|---|---|
| 429612 | * 6/1935 | (GB) | 222/386.5 |
| 2172934A | 10/1986 | (GB) | |
| WO 8900868A | 2/1989 | (WO) | |
| WO92/05406 | 9/1991 | (WO) | |
| WO94/21551 | 3/1994 | (WO) | |
| WO 9606036A | 2/1996 | (WO) | |
| WO 9746446A | 12/1997 | (WO) | |

OTHER PUBLICATIONS

Communication from EPO dated Jan. 01, 2000—European Search Report.

* cited by examiner

Primary Examiner—Joseph A. Kaufman
(74) Attorney, Agent, or Firm—Jeffrey L. Wendt (57) ABSTRACT

Briefly, this invention uses one or more pressure vessels having installed therein on its inside a balloon of flexible and non-expandable wall to smoothly and continuously deliver a chemical to any end user without contamination and gas dissolution. Since the balloon installed inside the pressure vessel isolates a high pressure gas from the chemicals, gas dissolution in the chemical and the resulted gas bubble problems are effectively eliminated. Further, contaminants in the high pressure gas which fills the balloon will not be transferred into the chemical and the extremely toxic chemical will not be transferred into the gas to be exhausted as a serious environmental issue. Unlike the vacuum/pressure system, the contamination by the ambient air leaking into the system is avoided because the disclosed delivery system is always with the pressure higher or equal to the ambient pressure.

19 Claims, 8 Drawing Sheets

METHODS AND SYSTEMS FOR DISTRIBUTING LIQUID CHEMICALS

BACKGROUND OF THE INVENTION

1. Field of the Invention

This invention relates to the distribution of liquid process chemicals from a bulk source or container to one or multiple end users, especially for the distribution of ultrapure liquid chemicals to semiconductor wafer and electronic chips manufacturing users.

2. Related Art

In many manufacturing processes various chemicals are required to be distributed from a bulk source to the point-of-use without contamination and deterioration of the chemical qualities. For example, in semiconductor wafer and computer chip manufacturing processes, ultrapure chemicals are needed for cleaning, etching, and surface treatment, and the like. These chemicals may include some caustic, acids, and organic liquids, such as ammonium hydroxide, sodium hydroxide, hydrofluoric acid, nitric acid, sulfuric acid, phosphoric acid, acetic acid, hydrogen peroxide, isopropyl alcohol, tetramethylammonium hydroxide, chemical slurry, and mixtures of the above or different chemicals. The chemicals must be at the user's point regardless of the continuous or intermittent usage. The chemicals must also be maintained at high purity level and without being contaminated during the delivery and distribution from bulk sources.

A few methods have been provided for distributing the chemicals so far. One of the methods is the so called "vacuum-pressure" distribution disclosed by Johns (WO92/05406), Magnasco and Viale (U.S. Pat. No. 4,524,801), Geatz (U.S. Pat. No. 5,148,945), Bernosky et al. (WO94/21551, U.S. Pat. No. 5,370,269), and Ferri and Geatz (U.S. Pat. No. 5,330,072 and U.S. Pat. No. 5,417,346). The basic idea is that the chemical to be delivered is withdrawn from a bulk chemical source by virtue of the vacuum inside a pressure vessel created with a vacuum pump and then distributed to the user by pressurizing the chemical with inert gas. The chemical can be distributed continuously with more than two systems in parallel and to a user away at a far distance by operating at a high pressure. However, this "vacuum-pressure" method has several drawbacks. First, the chemical can be contaminated by the leakage of ambient air into the system because of the negative pressure inside the system. Another drawback is that the vacuum pump used to create vacuum has high down time because of the corrosion of the pump components by the chemical vapor and droplets. Yet another drawback is that the exhaust of the inert gas with the chemical vapor and droplets from the vacuuming procedure produces an environmental concern. This exhaust may be saturated by the chemical, especially in the distribution of high vapor pressure chemicals. Since the inert gas directly contacts the chemical at a high pressure, the gas will dissolve in the liquid phase and become bubbles in the chemical. The bubbles may result in a serious quality problem in the wafer and electronic chips manufacturing. For example, they may attach to the wafer surface and create a non-wetted spot on the surface.

Another method to distribute the chemical to the end users is the so called collapsible container method disclosed by Ramsay (U.S. Pat. No. 5,570,815). With this method, the chemicals to be distributed must be filled within a container with flexible walls. This container is then positioned inside a pressure vessel and squeezed with a high pressure gas. Therefore, the chemical is pushed out of the container and delivered to the users. The chemical does not directly contact with the high pressure gas as with the vacuum-pressure method. However, the chemical quantity in the container is difficult to be monitored, and therefore, it is difficult to continuously deliver the chemical. Another drawback of this method is that the distribution system with this method can not be controlled automatically. Further, the collapsible container can be easily broken especially at the fixing points under the high pressure because of the disjoining force of the high pressure gas.

Another widely practiced method is the pumping delivery method. A positive displacement pump, such as a double diaphragm pump driven by air or gas, is used to deliver the chemical from a bulk source or an intermediate container to the end users. As the technical development, the lift force of this type of pump has been improved. For example, a Yamada diaphragm pump can operate at the pressure up to 50 PSI. This lift force, however, is still not high enough for many applications, especially for the practice of viscous chemicals and long distance delivery. Another drawback is the contamination of the impurities shed from the components of the distribution system due to the flow pulsation produced by the pump.

Another method is the so called pump-pressure distribution. A pump is employed to deliver the chemical from a bulk source to a pressure vessel. The chemical in the vessel is then pressurized with high pressure gas to be delivered through a distribution system to the end users. Some of the above mentioned drawbacks with the vacuum/pressure and the pump delivery methods still exist. First, the gas directly contacted with the chemical will dissolve in the chemical and become bubbles that result in serious problem on the wafer or micron chip surfaces. Second, the impurity shedding from the filters and other components by the pulsation upon the start of a pump will contaminate the ultrapure chemicals.

SUMMARY OF THE INVENTION

Methods and apparatus for distributing process liquid chemicals, preferably ultrapure liquid chemicals, are disclosed. Chemical from a bulk source is pumped into a pressure chamber between the internal wall of a pressure vessel and a balloon-like gas bag installed inside the pressure vessel, and then pressurized with the balloon while it is filled with high pressure gas for distributing to one or multiple end users through a series of conduits and flow control devices. The use of a balloon avoids direct contact of the high pressure gas with the liquid chemical, and therefore, the possible contamination and dissolution of the gas in the chemical. The exhaust from the balloon inside the pressure vessel during de-pressurization has no environmental concern. A pump used to deliver the chemical from the bulk source to the pressure chamber assures the system always in a positive pressure to eliminate the contamination by ambient air leaking into the system and the downtime due to the failure of a negative pressure system. Use of optional duplicate pressure chamber provides the option for continuously distributing the chemical to end users from one chamber while another chamber is in filling operation mode. The chemical can recirculate through a loop back to the bulk source before going to the pressure chamber for any quality reason. The chemical can also re-circulate from the pressure chamber either back to the bulk source or to another pressure chamber. One of the other re-circulation loops may be used for re-circulating the redundant chemical from the user station to the bulk source. The distribution apparatus of this invention is preferably integrated into a cabinet and preferably controlled with an electronic control system.

With the inventive aspects disclosed in this application, many of the problems associated with previous chemical transferring and/or distribution systems and methods have been solved. Briefly, this invention uses one or more pressure vessels having installed therein on its inside a balloon of flexible and non-expandable wall to smoothly and continuously deliver a chemical to any end user without contamination and gas dissolution. Since the balloon installed inside the pressure vessel isolates a high pressure gas from the chemicals, gas dissolution in the chemical and the resulted gas bubble problems are effectively eliminated. Further, contaminants in the high pressure gas which fills the balloon will not be transferred into the chemical and the extremely toxic chemical will not be transferred into the gas to be exhausted as a serious environmental issue. Unlike the vacuum/pressure system, the contamination by the ambient air leaking into the system is avoided because the disclosed delivery system is always with the pressure higher or equal to the ambient pressure.

The chemical is supplemented from bulk source into the pressure vessel with a pump through a conduit, preferably with a pulsation damper and other components. The use of a flow pulsation damper effectively suppresses the pulses produced by the diaphragm pump, one or more optional filters installed downstream of the pump catch particulate impurities in the chemical either originated from the moving parts of the pump or existing in the bulk chemical. A by-pass conduit is also preferably provided to allow the chemical to circulate back to the bulk source before going to the pressure vessel if it is necessary. Hence, in the case of any quality problem chemical will then be recirculated back through the by-pass conduit to the bulk supply container. Unlike previously known distribution systems, the chemical quality including the assay concentration and the purity level will be ensured, and the possibility of the system contamination by unexpected chemical is completely eliminated.

The quality of the chemical delivered to the end user is further improved by preferably monitoring the impurity levels, such as particles and ionic impurities, either on line or off-line. The chemical from the high pressure delivery vessel is preferably monitored for purity. With high concentration of impurities the chemical is recirculated back to the bulk supply source through another circulation conduit. This circulation conduit also provides the path for the surplus chemical during the low demands by the end users back to either the bulk source or to another pressure vessel in parallel.

One or more additional recirculation conduits are preferably provided to recirculate surplus chemical from the end user stations to either the bulk source or another pressure vessel in the filling operation mode. This recirculation further improves and assures the chemical quality. Any contaminant existing in the chemicals will not accumulate at any local section and, therefore, eliminates the contamination problem.

By using two or more pressure vessels containing the same chemical, the chemical may preferably be continuously distributed to the end users without interruption. The chemical is distributed from one pressure vessel while another one is either in filling mode or waiting for chemical distribution operation. This preferred continuous distribution not only assures the user's needs at any time but also eliminates the contamination induced by the intermittent operation as in previously known delivery systems.

The reliability of the inventive systems are improved by eliminating vacuum pumps. There is no down time because of vacuum pump failure due to corrosion problems. System reliability is also improved by preferably automatic operation with a computer (PLC). The chemical levels in the pressure vessels, the valves, and the pump are preferably automatically controlled and coordinated with the computer (PLC) for a smooth and continuous delivery. The distribution system including the electronic control devices are preferably integrated into a cabinet. Therefore, the operation can be easily monitored and/or controlled. The use of a cabinet also helps to save space that previous distribution systems occupied.

Accordingly, a primary object of this invention is to provide processes and systems for smoothly and continuously delivering chemicals, preferably ultrapure, from a bulk source to any end users without contamination.

Another object of this invention is to provide processes and systems to deliver the ultrapure chemicals reliably without any component and parts failure.

Yet another object of this invention is to provide processes and systems to isolate the chemical from the high pressure gas to eliminate the dissolution of the gas in the chemical and any impurities in the gas to contaminate the chemicals.

An additional object of this invention is to provide processes and systems to isolate the chemical from the gas to eliminate the toxic chemicals in the exhaust and, therefore, to eliminate the environmental concern and reduce the overall cost.

Yet another object is to provide methods to assure the chemical quality and to eliminate system contamination by non-qualified chemicals from the bulk source hence the downtime by employing recirculation loops at different locations.

Yet another object of this invention is to provide processes and systems with the options for on-line or off-line monitoring and analyzing the chemical assay and impurity concentrations.

Yet an additional object of this invention is to provide processes and systems that employ components such as the pumps, valves, sensors, and probes that can be controlled and operated automatically directly or indirectly with a computer, or an electronic control system.

Another object of this invention is to provide processes and systems that employ a computer (PLC) for system operation at the highest reliability and the highest quality of the chemical delivery.

Yet another object of this invention is to provide systems comprising a cabinet having the inventive distribution system therein for safety of operation and the reduction of the space use.

The processes and systems of the invention preferably use two or more pressure vessels with balloon-like gas bags installed inside to deliver chemicals. A chamber between the balloon and the pressure vessel interior wall is filled with the chemical at atmospheric pressure by a pump, and then pressurized by the balloon when the balloon is filled with high pressure gas to transfer the chemical. By installing a balloon inside the pressure vessel, the high pressure gas is isolated from the chemical and mutual contamination is eliminated. By monitoring the chemical level inside the pressure vessel with level sensors, two or more pressure vessels may be operated alternately at filling or pressurizing mode.

By transferring the chemical from a bulk source to the pressure vessel with a pump the chamber is filled with chemical at a positive pressure. By preferably using a pulsation damper and a filter following the pump the pulses produced by the pump are eliminated and the particulate contaminant is removed. By preferably employing a recirculation loop before the pressure vessel the chemical can be recirculated back to the bulk source container and maintained at a high purity by multiple filtration.

Three more recirculation loops are preferably provided for the chemicals in the pressure vessels either being transferred to another vessel or to the bulk source container. By using the loops the pressure vessel can be evacuated if any maintenance is needed while another vessel continues the distribution; the surplus chemicals from the user station can be recirculated back either to the bulk source or to another vessel in filling operation; a portion of the chemicals from the pressure vessel can be recirculated back to the bulk source or another pressure vessel while the remaining portion is delivered to the user stations.

The invention uses components that preferably can be operated and controlled with a computer via electronic means. The computer receives signals from monitoring sensors and controls and adjusts the process, preferably instantaneously, for the chemical quality, flow rate, chemical filling, gas pressure in the balloon, chemical re-circulation, and status of the system operation. With the advantages of a chemical distribution cabinet an optimum operation condition and the best quality of the chemical delivery and transfer are achieved.

For those familiar with the state of the art, the mentioned above and other objects of this invention will be immediately realized through reviewing the following description.

DESCRIPTION OF PREFERRED EMBODIMENTS

The present invention provides processes and systems to effectively transfer and deliver process chemicals to any end users. The inventive systems primarily comprise four parts: a chemical filling module, a pressurization and pressure release module, a chemical delivery module, and an electronic control module. Preferred embodiments of the inventive systems and components, and the operation of each component embodiment, are described as follows.

Chemical Filling Module

Figure 1:
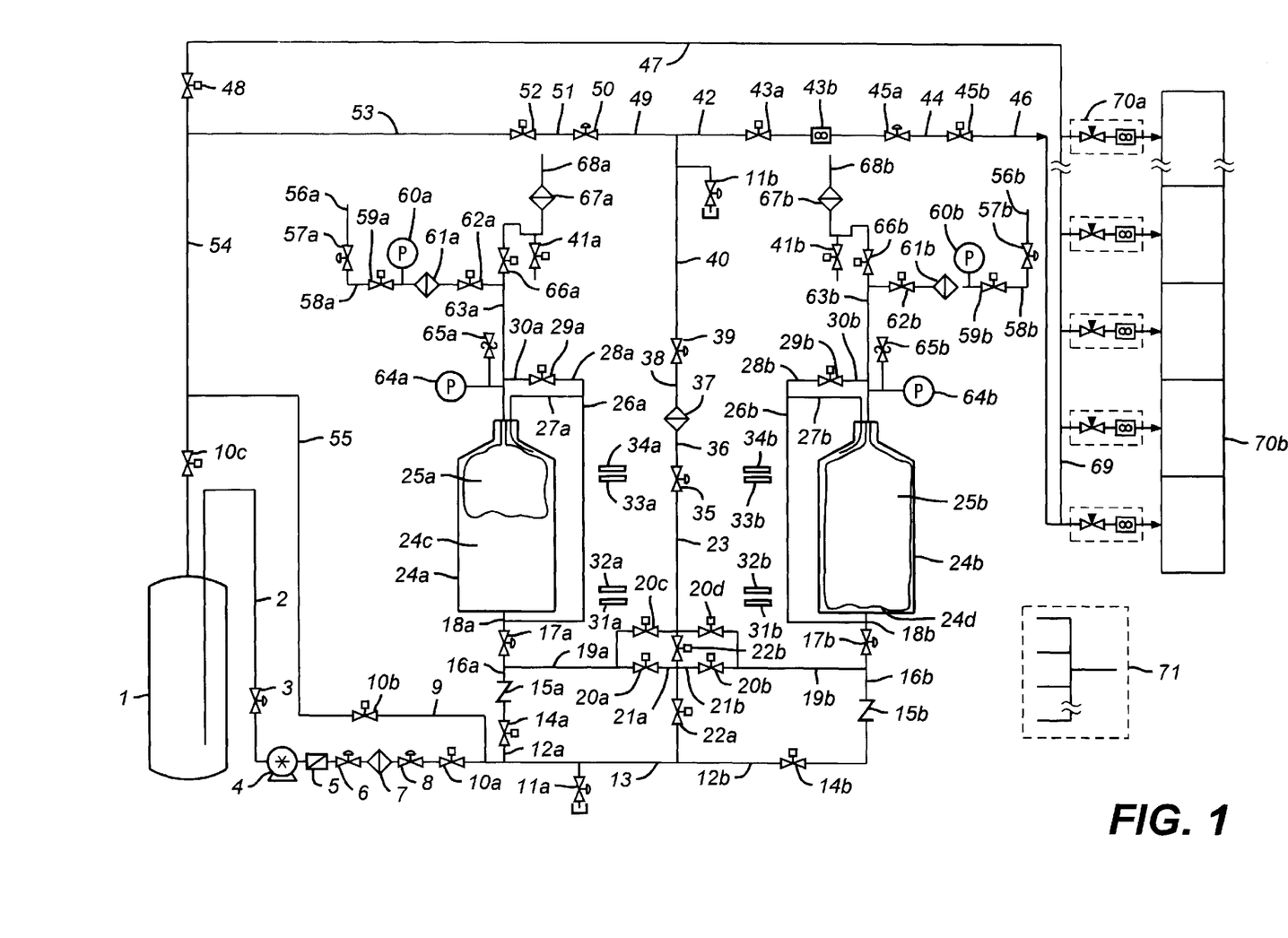
FIG. 1 is a schematic representation of one inventive system to transfer and deliver chemicals from a bulk source to any end user.

The chemical filling module functions to transfer chemical from a bulk source to one or more pressure chambers for distributing to the end user and to recirculate the chemical through a filter back to the bulk source container. Referring now to FIG. 1, chemical is withdrawn with a pump 4 from a bulk source 1, through an intake line 2, an isolation hand valve 3, and is then transferred to the pressure vessels through a pressure pulsation damper 5, a filter 7 with isolation hand valves 6 and 8 at both sides, an automatic isolation valve 10a, a line 13, and another line 12a, an automatic isolation valve 14a, a check valve 15a, a line 16a, an isolation hand valve 17a, and a line 18a and then going into pressure chambers 24c and 24d from the bottom of pressure vessel 24a and 24b. Although not shown, the lines 18 can connect to the pressure vessels at the top, or at the shoulder.

In this chemical filling system, a recirculation embodiment is used to circulate the chemical from and back to the bulk source. Chemical is recirculated back to bulk source 1 from a point after automatic isolation valve 10a through a line 9, an automatic isolation valve 10b, another line 55, another automatic isolation valve 10c, and a portion of line 54.

A port with an isolation hand valve 11a is connected to line 13 for taking samples. Any on-line monitoring instruments, not shown, such as a particle counter, an assay concentration sensor, or an ionic impurity sensor can be connected to this port. Although not shown, systems of the invention can also embody flow sensors and transmitters to monitor the flow rate of chemical through the system.

The liquid level inside pressure chambers 24c and 24d are preferably monitored with level sensors mounted on the outside wall of the tubes 26a and 26b that are connected to the bottom of pressure vessels 24a and 24b through lines 18a and 18b and to the top of the vessels through the lines 27a and 27b. These tubes can be plastic materials, such as high density polyethylene, TEFLON, or PFA. Signals from low level sensors 32a and 32b and high level sensors 33a and 33b warn a computer (PLC) to start or stop the chemical filling by triggering valves 14a and 14b. Signals from low-low and high-high level sensors 31a,31b,34a and 34b are used to alarm the operator for any inspection and maintenance of the filling and pressurization systems. There are many choices for the level sensors. Preferred level sensors are of the capacity type such as those from Allen-Bradley (Germany).

The lines can be any plastic materials compatible with the chemicals, preferred in this invention are TEFLON and PFA material. The pump can be any type of positive displacement pump, such as dual diaphragm pumps, or a bellows pump. The materials for the pump and the pulsation dampers can be any compatible plastic materials. Preferred are TEFLON diaphragm pumps, dampers by Yamada (Yamada America, Inc. Schaumburg, Ill.), and those by ASTI (Courbevoie, France). The automatic isolation valves can be TEFLON solenoid valves, TEFLON pneumatic valves, and any other similar valves. Preferred are TEFLON pneumatic valves. The isolation hand valves and the check valves can also be any such types of valves made with compatible materials, preferably TEFLON and PFA valves. All of the isolation and check valves are available from Fluoroware (Chaska, Minn.) and other companies.

Another preferred embodiment with which chemical is filled inside the balloon and the high pressure gas is filled in the chamber between the vessel wall and the balloon can be used for the transfer and distribution of chemicals. The chemical can be squeezed out from the top of the balloon. The embodiment illustrated in FIG. 1 can be easily modified by changing the chemical filling lines and the pressurization lines to accommodate the distribution needs.

Pressurization and Pressure Release Module

The chemicals inside the pressure chambers 24c and 24d are motivated by a balloon-like pressure bag filled with a high pressure gas. This high pressure gas can be any inert gas, such as nitrogen, argon, helium, and purified compressed dry air. The gas pressure can be in the range of 1 to 100 psig, depending on the physical properties of the chemicals, distance from the delivery unit to the end user, and the pressure required at the user location. Nitrogen gas is preferred in this invention because it is pure and easily available at most of the chemical user's sites.

As illustrated in FIG. 1, the gas from a bulk source, not shown, flows through a manifold connector, not shown, to conduits 56a and 56b. Isolation hand valves 57a and 57b are used to fully stop the gas flow manually when repair and replacement of any parts downstream are necessary. The gas then passes through lines 58a and 58b, pressure regulators 59a and 59b, pressure transducer 60a and 60b, filters 61a and 61b, and then to automatic isolation valves 62a and 62b. Of course, these two conduits with the gas lines, valves, regulators, and the filters can be combined to become a single line, and the gas is then separated after the filter 61 to flow to the respective isolation valves 62a and 62b. The two separate conduits are preferred for the better control and operation, especially for assuring the preferred continuous delivery of the chemical during the replacement of any component, such as the gas filter. The gas then flows through conduits 63a and 63b to respective balloon bags 25a and 25b inside pressure vessels 24a and 24b. Pressure transducers 64a and 64b are used to monitor the gas pressure inside the balloons, and the pressure relief valves 65a and 65b to release the pressure inside balloons 25a and 25b once the pressure is higher than that required in any case.

The high pressure gas inside balloons 25a and 25b is released before the chemical filling starts. Automatic isolation valve 62a or 62b is closed, and automatic isolation valves 66a and 66b are opened to let the gas inside the balloon exhaust from the balloon through conduits 63a and 63b. The exhaust passes through filters 67a and 67b. Lines 68a and 68b can be connected with the main exhaust system of the facility. Any trapped chemical gas inside the pressure vessels can be released through lines 27a and 27b, lines 28a and 28b, automatic isolation valves 29a and 29b when they are open, and then lines 30a and 30b to the pressure release conduits. Preferably, valves 66a and 66b are open during the chemical filling procedure for the balloon at the atmospheric pressure. Valves 29a and 29b are preferably open during the chemical filling but these valves can be closed unless the trapped chemical gas needs to be released from the pressure vessel.

The lines 56a,56b,58a and 58b can be either stainless steel, such as electronic polished 316L stainless steel, or plastic material, such as polypropylene and TEFLON PFA. The valves 57a and 57b can be the electronic polished stainless steel valves from AP Tech (Napa, Calif.) and the TEFLON PFA hand valve from Fluoroware (Chaska, Minn.). Regulators 59a and 59b are preferably those electronic pneumatic regulators with stainless steel material, such as those from AP Tech and SMC Pneumatics (Warrenville, Ill.). The pressure transducers can be piezoelectric type or capacitance type, preferred in this invention are those all plastic capacitance type pressure transducers such as those available from Fluoroware and NT international (Minneapolis, Minn.). Filters 61a and 61b are preferably disposable metal or plastic filters with a pore size of 0.1 $\mu$m. Metal disposable filters from Millipore (Bedford, Mass.) can be used for this purpose. Although there are plenty of material choices for the valves 62,66, and 29, the pressure transducers 64, and pressure relief valves 65, it is preferred to use TEFLON PFA pneumatic valves, all TEFLON pressure sensors and pressure relief valves such as available from Fluoroware (Chaska, Minn.). Filters 67 are used mainly to remove chemical droplets that could be entrained in the exhaust when valve 29 is open. These filters are preferably the disposable plastic polypropylene or TEFLON membrane filters with pore size of 0.1 $\mu$m from Millipore.

As illustrated in FIG. 1, the lines after the automatic isolation valves 66a and 66b are preferably U shaped to trap any liquid from the filters 67. Hand valves 41a and 41b are located at the low point of the U shape lines for releasing the trapped liquid. These hand valves can be replaced with an automatic isolation valve conjugated with a liquid level sensor (not shown) for monitoring the liquid in the U tube. Although not shown, a compact muffler can be installed after the filters 67 to silence the noise from the release of the high pressure exhaust gas from the balloon bags.

Chemical Delivery Module

This system functions to deliver the chemicals from the pressure chambers 24c and 24d of the pressure vessels 24a and 24b to end users 70b through a series of conduits and control components.

Figure 8:
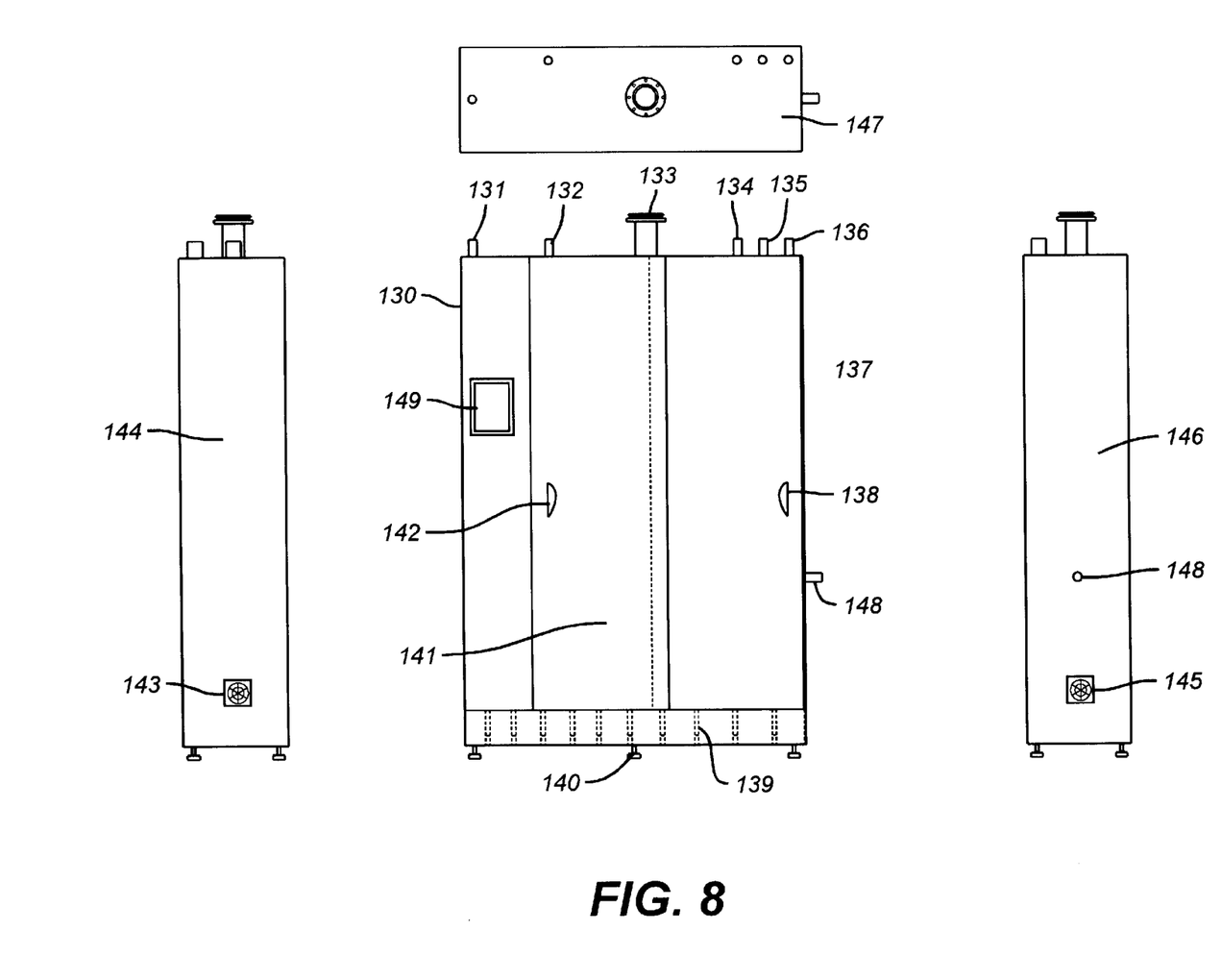
FIG. 8 is a schematic diagram showing a chemical distribution cabinet useful in this invention.

The pressure chamber is ready to deliver chemicals to the end users once the filling procedure is completed. After the chemical is pressurized with the balloon filled with the high pressure gas, the chemical flows through the normally open hand valve 17a or 17b, line 19a or 19b, an automatic isolation valve 20c or 20d, line 23, a filter 37 with two hand valves 35 and 39, line 40, and conduit 42 with a series of valves and flow meters to the line 46, and then the chemical distribution manifold 69 near the user stations 70b. Conduit 42 consists of a motor driven needle valve 43a and a flow transmitter 43b, a normally open hand valve 45a, a line 44, and an automatic isolation valve 45b. Flow meter 43b is used to provide the flow rate through the system to the computer (as illustrated in FIG. 8) for system operation control. Needle valve 43a is preferably automatically adjusted with a signal from the computer based on the flow reading from 43b and a preset parameter. The flow transmitter is preferably of the pressure difference type such as those available from NT International (Minneapolis, Minn.), a flow vortex type such as those available from ASAHI America (Malden, Mass.), or an ultrasonic type such as those from Honda Electronics through Nano-Master U.S.A., Inc. (Austin, Tex.). Particularly preferred are the ultrasonic type. As the valves in the chemical filling system, pneumatic valves are preferably to be used as the automatic isolation valves, and both isolation hand valves and the automatic valves can be those valves with the TEFLON PFA material from Fluoroware.

Flow manifold 69 preferably comprises a series of flow lines and flow control boxes 70a. Each flow control box preferably comprises a needle valve for adjusting the flow through the line and a flow meter to monitor the flow rate. The needle valve can be either a motor driven type or a manual operation type. Preferred are motor driven type for computer control. The flow meter can be of the same type as the flow meter 43b, and can also be a hand operation rotameter with TEFLON material such as those available from Fluoroware.

Filter 37 functions to assure the particulate impurity level in the chemical is within the specification. A 10 inch diameter cartridge filter having pore size of 0.05 μm is preferred in this invention. This type of filter is available from several manufacturers, such as Millipore (Bedford, Mass.) and Pall (East Hills, N.Y.). The material for the filter cartridge and filter housing are selected based on the chemical properties. For example, the Millipore Wafergard PF-80 cartridge filter having pore size 0.05 μm and the Chemgard PFA housing are preferred for hydrofluoric acid delivery system. The filter vent line with an isolation hand valve is connected to the general vent system, not shown. Another filter system with the same type of filter and two isolation valves before and after the filter are preferred. This filter system is installed in parallel with the filter system 37. When the filter cartridge needs to be replaced the flow is cut off with the isolation valves 35 and 39, and the flow goes through another filter system by opening the isolation valves before and after the filter.

A port with an isolation hand valve 11b is connected to line 40 for taking samples. As for the chemical filling system, on-line monitoring instruments, not shown, such as a particle counter, a chemical assay concentration sensor, or an ionic impurity sensor can be connected to this port for monitoring chemical assay concentration, and impurity concentrations.

The total flow rate is controlled at the rate at least same as the sum of each user's maximum demand, preferably a rate of at least 1 liter per minute higher than the sum. This superfluity is to keep the chemical delivery line always flushed, and chemical flows back through a returning conduit 47 with an automatic isolation valve 48, a line 54, and another automatic isolation valve 10c back to bulk source 1. During low or zero use the chemical is re-circulated back through conduit 47 to the bulk source 1. In any case, the operation of the delivery system is not necessarily changed.

A conduit 49 is provided for re-circulating the chemical back to bulk source 1 in the case of chemical quality low in terms of either assay or impurity level. The chemical from filter 37 flows through conduit 49 with a hand isolation valve 50, a line 51, an automatic isolation valve 52, a line 53, and a line 54 and valve 10c, back to the bulk source 1. This re-circulation arrangement is useful especially during the beginning use of the system for the system cleaning up. When this recirculation is necessary valve 45b, valve 48, and valve 10b are preferably closed but not necessarily always. The chemical can also be re-circulated to another pressure vessel that is in filling mode by opening valve 10b and closing valve 10a.

Conduits 21a and 21b are provided to re-circulate the chemical or empty the vessel by allowing the chemical flow to another vessel through either conduit by opening valves 20a or 20b. The flow goes through valve 22a, line 12a or 12b, valve 14a or 14b, check valve 15a or 15b, line 16a or 16b, valve 16a or 16b, hand valve 17a or 17b, and line 18a or 18b to the corresponding pressure chamber. The chemical can also flow back to the bulk source through the line 13, line 9, valve 10b, line 55, and valve 10c. The valves either 20c or 20d, and 22b are closed if the re-circulation and the vessel emptying are necessary. This design of the re-circulation conduits allows one vessel to continue the delivery of chemical while another one is in the re-circulation mode or emptying operation.

Figure 2:
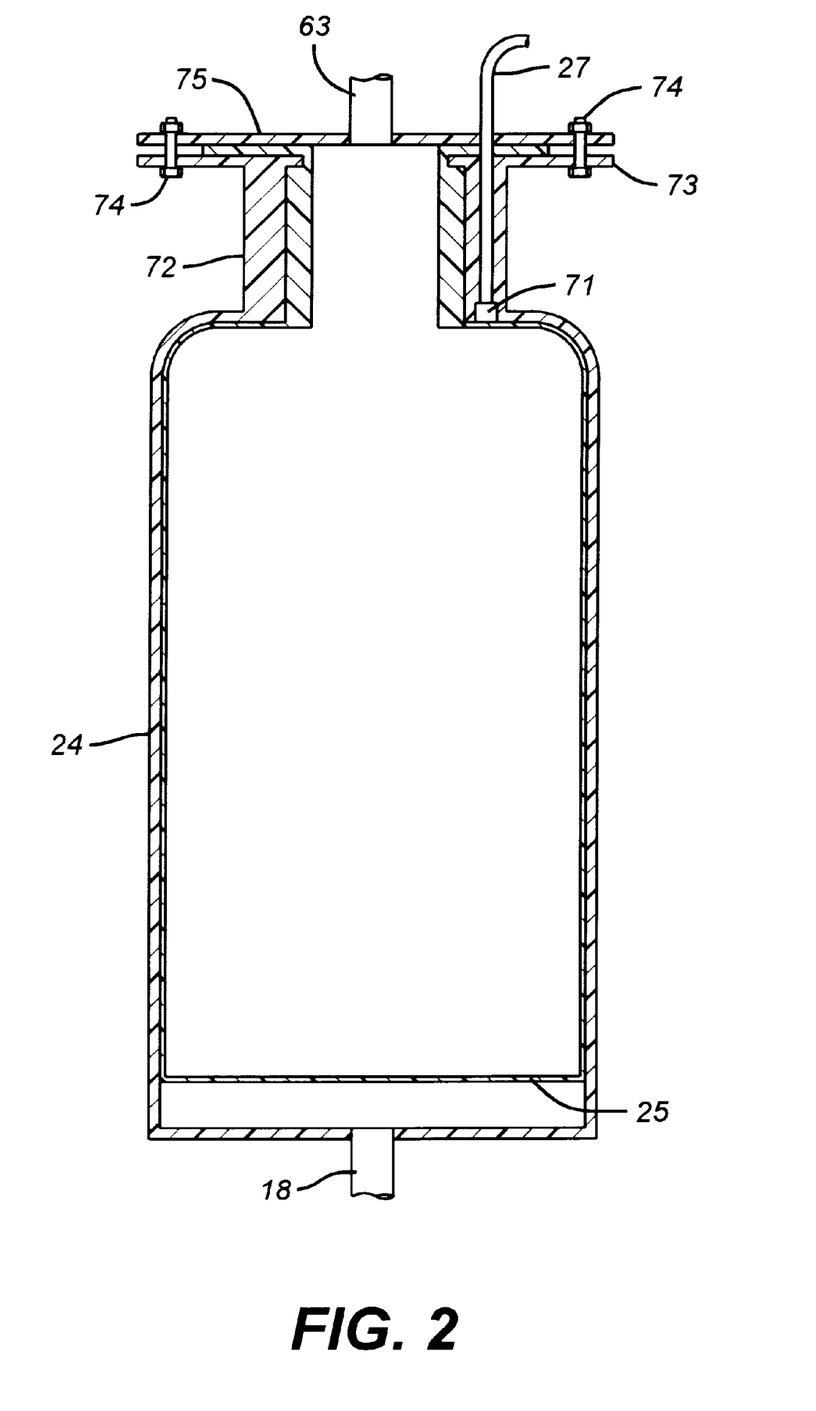
FIG. 2 is a schematic representation of an inventive pressure vessel with a balloon type pressure bag installed inside.
Figure 3:
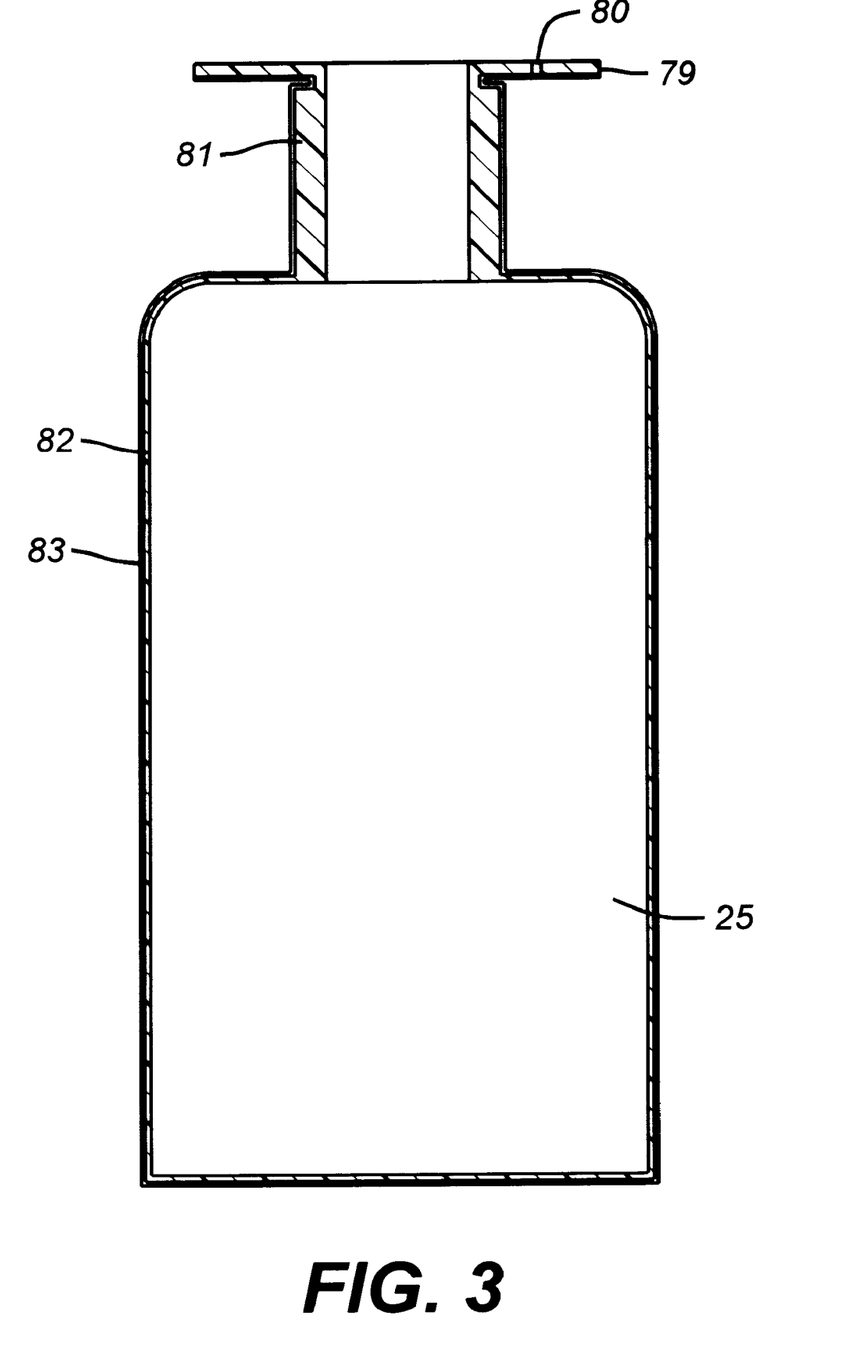
FIG. 3 is a schematic illustration of the balloon type pressure bag for receiving high pressure gas.
Figure 4:
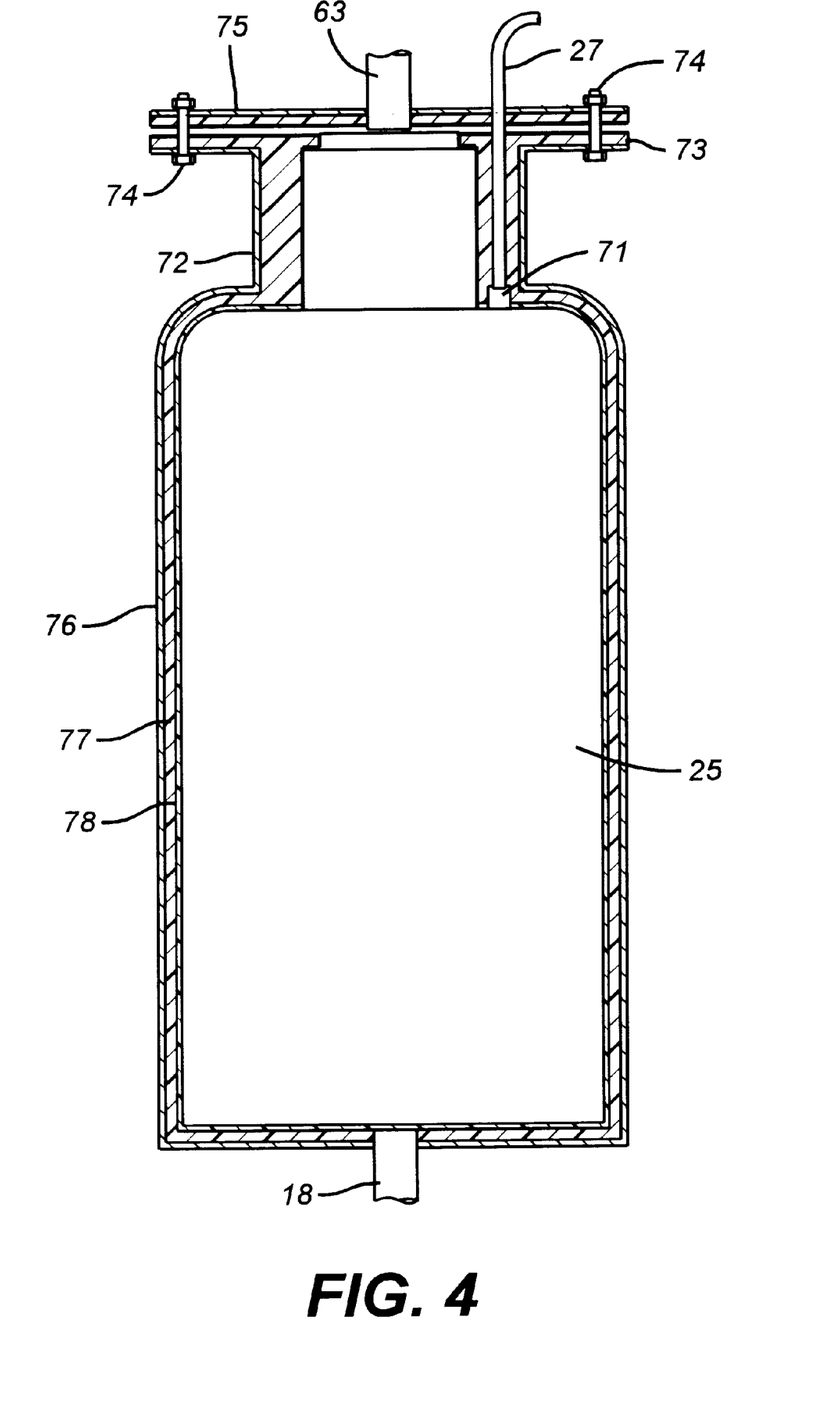
FIG. 4 is a schematic drawing of an inventive pressure vessel.

Chambers 24c and 24d between the pressure vessels receive and discharge chemicals to be delivered to the end users. One of the preferred embodiments of the pressure vessel with the relative positions and physical shapes of the vessel and the balloon are illustrated in FIGS. 2,3, and 4. Both the vessel 24 and the balloon 25 preferably have the cylinder type body with a neck 72 and 81 and flange 73 and 79 in the top. The flange 73 and another security flange 75 have a series of open holes around the flanges near the outside edges to let the fastening bolts 74 go through. The diameter of the balloon cylinder is the same or little bit bigger than the inside diameter of the vessel. The height of the balloon is preferably shorter than the vessel height but the same height is particularly preferred in this invention. Both the vessel and the balloon preferably have curved shoulders and sharp corners in the bottoms. Of course, the bottom corners can be curved as the shoulders. The balloon is installed inside the vessel and secured with flange 75 and bolts 74. The balloon neck preferably contacts directly with the inside wall of the vessel when it is filled with high pressure gas. Preferably, the bottom of the balloon and the interior side and bottom walls of the vessel form the chamber for chemicals. When the delivery starts, the high pressure gas is filled into the balloon through the inlet tube 63, and the balloon stretches along its length under the gas pressure to push the chemical out of the chamber through the tube 18 which is welded or otherwise attached on the vessel body at the bottom. The balloon can stretch all of the way to the vessel bottom or at a place away from the wall, depending on the flow level controlled and the length of the balloon. The balloon itself is subjected to a pressure difference of near zero across the wall.

The flange attached to the neck at the vessel top edges inside to form an opening smaller than the opening along the neck in diameter. This edge goes into the collar slot on the neck of the balloon right under its flange in the top. The edge and the slot are to provide a reliable fit for the balloon and the vessel and good holdup for the balloon. The balloon flange is smaller than that in the vessel in diameter, with the maximum diameter reaching the fasten nut.

A tube 27 passes through a hole in the security flange 75, a hole 80 on the balloon flange, and a hole in the neck of the vessel to reach a bigger hole 71 in the lower wall of the vessel neck. The tubes 27a and 27b are connected with the hole 71 by screwing on the vessel neck 72 with one end and connected with the tube 26a or 26b with another end. The tubes 27a,27b, and 26a, 26b allow the gas and liquid inside the tube 26a and 26b to communicate with the gas and liquid inside the vessel.

Balloons useful in the invention are preferably made with flexible materials such as plastic sheet or rubber sheet. Plastic sheet is preferred in this invention as the balloon material. This plastic includes polypropylene, polyethylene, and TEFLON materials. Another preferred material for the balloon is HYPALON sheet rubber which is available from several sources, such as DuPont. The side wetted with the chemical can be coated with chemical resistant material such as TEFLON. Since the balloon is not subjected to a large pressure difference, the balloon wall thickness can be as small as 0.5 millimeter with a much thicker wall for its neck and flange. A preferred embodiment of the balloon illustrated in FIG. 3 has the wall with the main body 82 and coated material 83.

The pressure vessel 24 must take the pressure applied by the high pressure gas. The wall 76 is preferably stainless steel such as 316L and 304L stainless steel coated inside with plastic material 77, such as polypropylene, polyethylene, and TEFLON materials, exposing a plastic surface 78 to the chemical. The outside wall is preferably wrapped with a layer of polyvinyl chloride (PVC) to strength the vessel for taking pressure and protect the vessel body. The vessel should be constructed to take pressure up to 10 bars, even though in most of the applications the operation pressure is in the range of 1 to 6 bars. The chamber formed by the pressure vessel and the balloon should hold the liquid amount to meet the peak consumption for at least 5 minutes, more preferably for 30 minutes.

Figure 5:
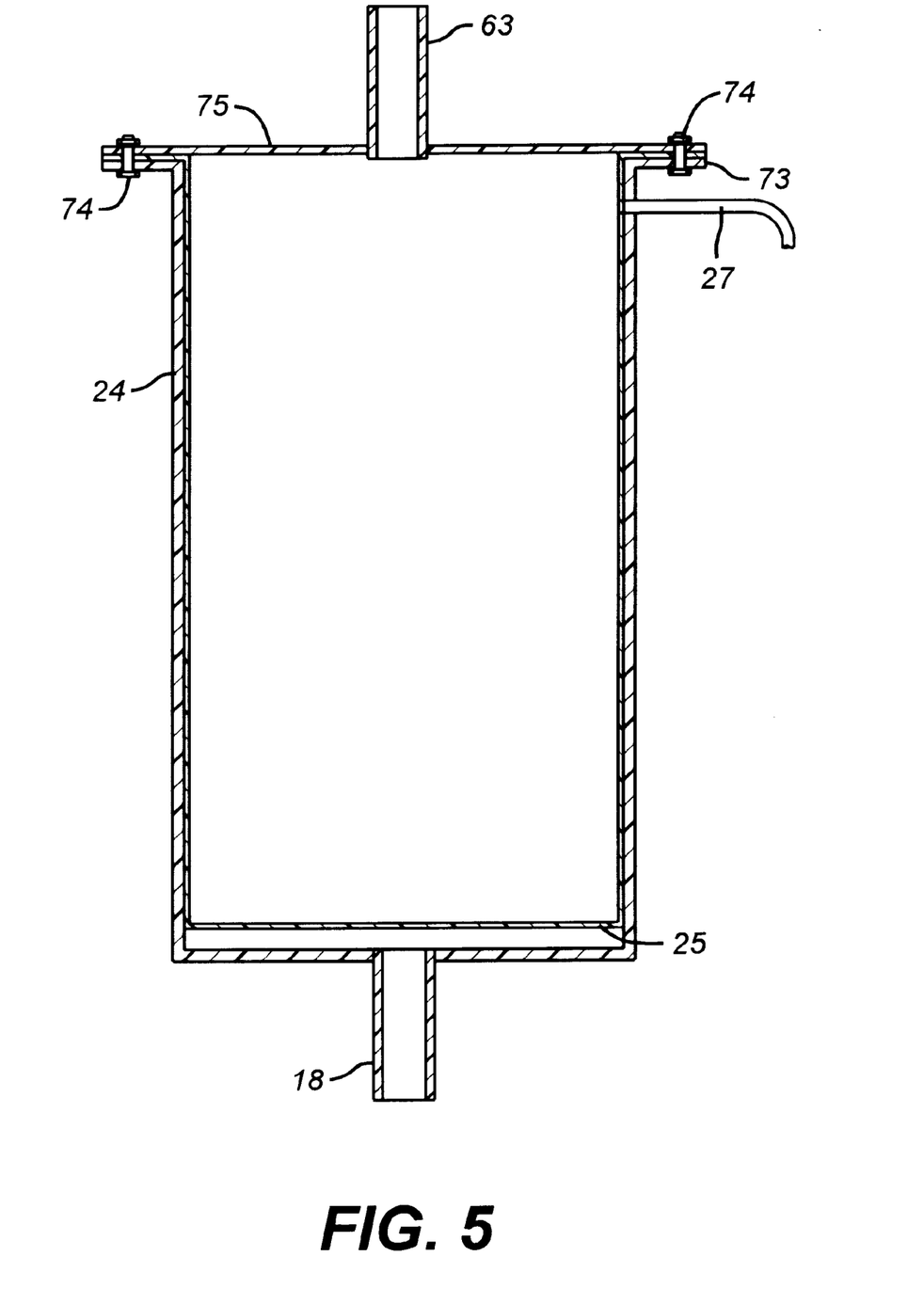
FIG. 5 is a schematic drawing of an alternative embodiment of an inventive pressure vessel with the balloon type pressure bag installed inside.

Another preferred embodiment of the pressure vessel with the balloon installed inside is illustrated in FIG. 5. The bodies of the vessel and the balloon are preferably cylindrical in shape without the neck. The materials for the vessel and the balloon can be exactly the same as those mentioned for the embodiment of FIGS. 2,3 and 4. Tube 27 now is connected with vessel 24 at the side right below flange 73.

For both preferred embodiments illustrated in FIG. 2 and FIG. 5, the balloon can be dropped inside the vessel through the top opening before securing the vessel with the top flanges.

Electronic Control System

Figure 6:
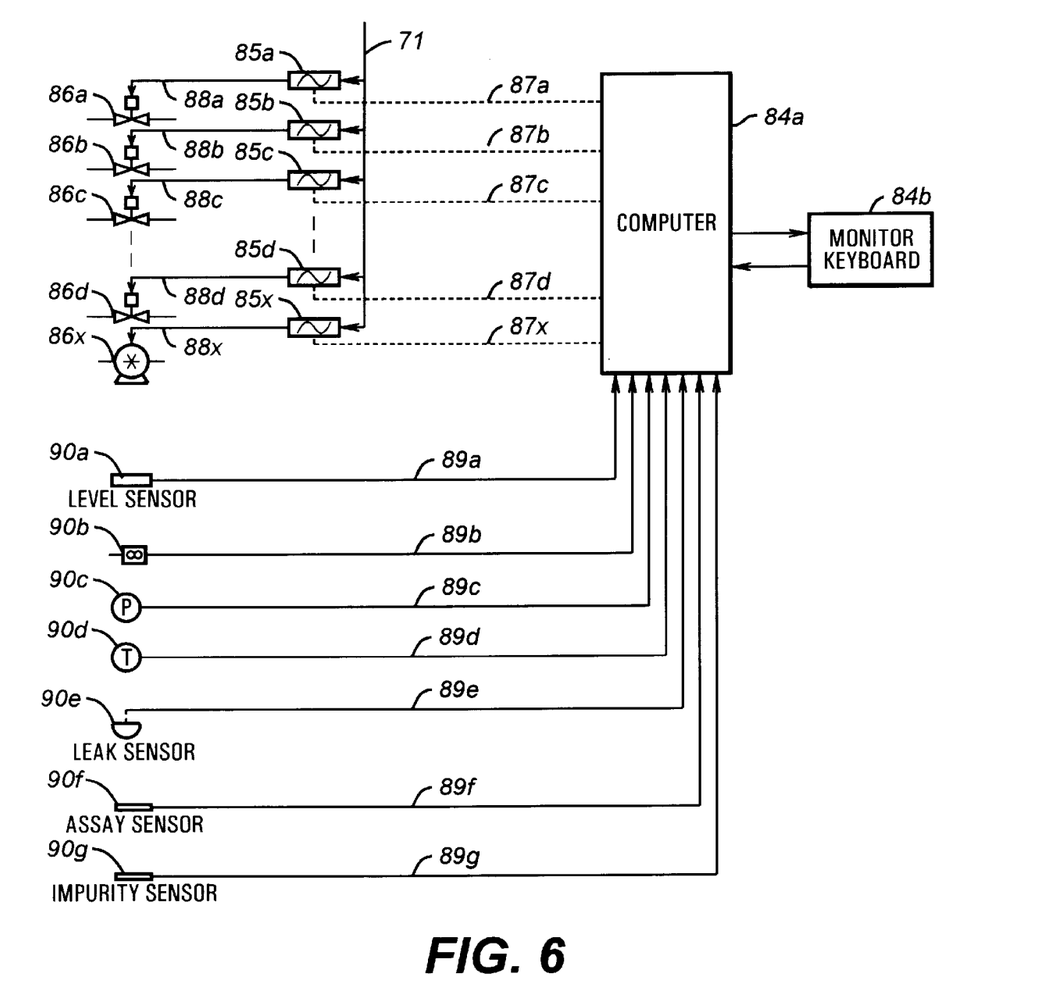
FIG. 6 is a schematic drawing of a preferred electronic control arrangement for use with the invention.

This invention preferably employs a computer system to receive signals from individual components, such as the level sensors, flow transmitters, pressure sensors, temperature sensors, leak sensors, assay concentration sensors, and impurity sensor, and the like, and also sends signals out to control the valves, and pumps and the like as illustrated in FIG. 6. The computer can be a desk top or laptop 386 and above personal computer with the RAM memory above 10 megabits and above. The data acquisition boards can be inserted inside the computer slots or in an external data acquisition system, such as the Keithley 500-series data acquisition system (Taunton, Mass.). There are several choices for the control software, one of the preferred is the Labtech Notebook software (Andover, Mass.). Another preferred computer system is the programmable logic controller (PLC) system such as that from Seimens for the data acquisition and operation control.

As illustrated in FIG. 6, signals from level sensor 90*a*, flow transmitter 90*b*, pressure sensor 90*c*, temperature sensor 90*d*, leak sensor 90*e*, assay concentration sensor 90*f*, and impurity sensor 90*g* flow electronically through wires 89*a*, 89*b*,89*c*,89*d*,89*e*,89*f*, and 89*g* to a computer 84*a*. Output signals from computer 84*a* flow electronically to a series of solenoids 85*a*,85*b*,85*c*,85*d*, and 85*x* through the wires 87*a*, 87*b*,87*c*,87*d*, and 87*x*. These solenoids are used to control the high pressure gas (such as nitrogen gas) from the gas manifold 71 illustrated in FIG. 1 to operate pneumatic valves such as 86*a*,86*b*,86*c*, and 86*d* and pneumatic diaphragm pumps such as 86*x*. The system operation can be monitored and interacted with computer monitor and key board 84*b* by the operator.

Figure 7:
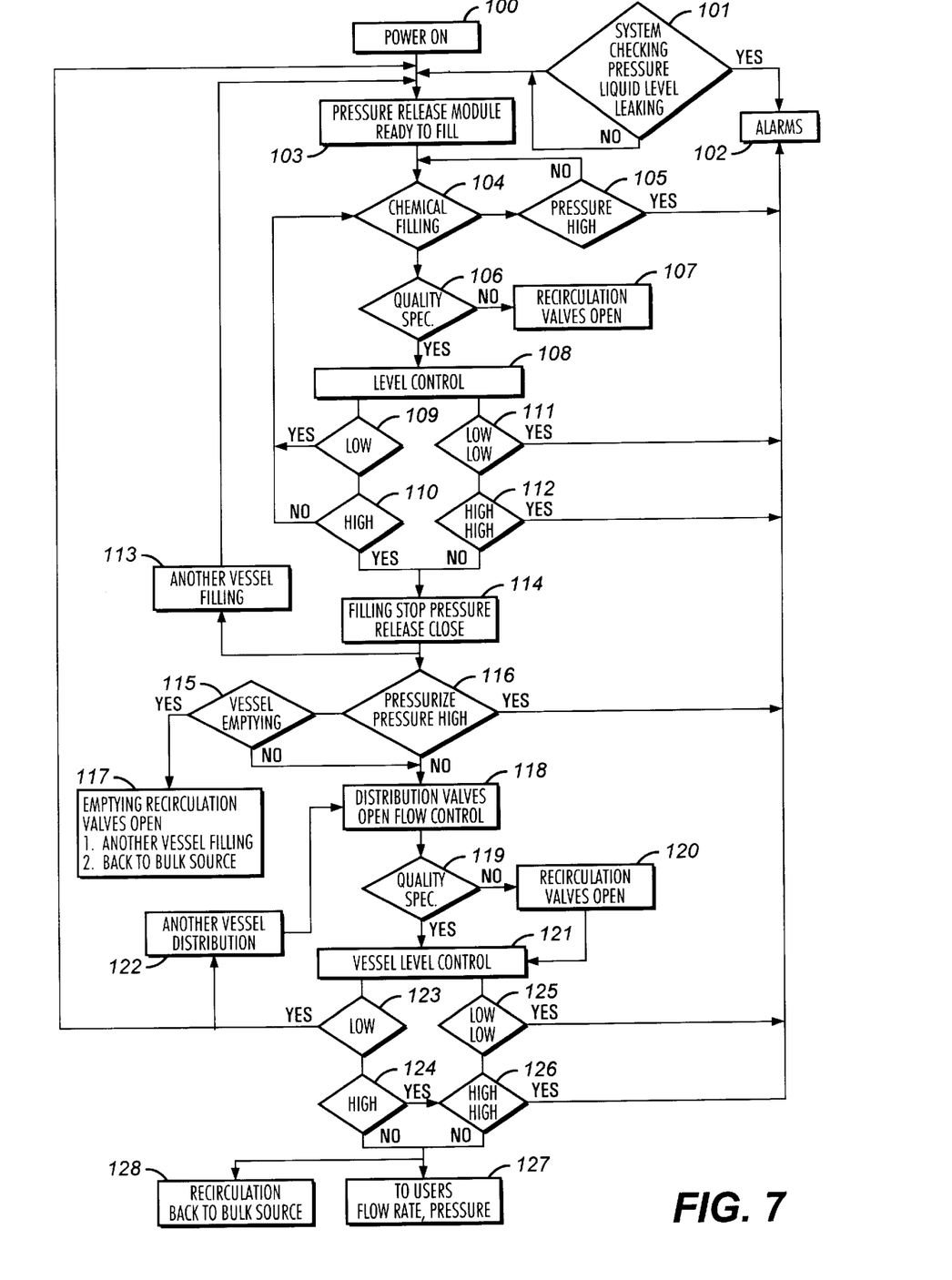
FIG. 7 is a logic flow chart demonstrating the electronic control system of FIG. 6.

The computer operation software can be customized based on a particularly preferred embodiment illustrated in FIG. 7. Depending on the program language and computer system, the computer control system can be different from the one illustrated in FIG. 7. With this preferred control system, power 100 to the computer is turned on for start. At this time, the computer preferably checks the status of the delivery system 101 for the system pressure, liquid level, chemical leakage, and other parameters. Once any fault is found, audio and visual alarms 102, or either audio or visual alarm, will be triggered. The system will alarm for a period of time until the fault is fixed or the alarm is manually terminated. The alarming time can be set for any time period, preferably 5 minutes. If the fault is not fixed or the alarm is not manually terminated in this time the system will be automatically shut down.

The system is ready for the operation if there is no fault found. The pressure release module 103 is initiated by opening the pressure release valve. The chemical filling module 104 starts to pump the chemical from the bulk source 1 through the filling system to fill the pressure chamber. The chemical quality monitor sensors 106 for the chemical assay concentrations and/or impurity concentrations provide the data to let the computer compare the data with the specification data stored in the computer. The chemical will be re-circulated by opening the re-circulation valve 107 if the specification is not met. The qualified chemical will be pumped to the pressure chamber where the liquid level is monitored with level sensors 108. The filling will be continued if the level is not high. At the same time, the low-low and high-high levels are monitored. The filling will stop once the high level is reached. During the filling, the system pressure 105 is also monitored. A signal will be sent to the alarm system if the pressure is higher than a preset pressure, and/or the liquid level is too low, and/or the level is too high. The pressure release system will be closed and the pressurize valve 116 will be on. At this time, filling 113 will preferably start with another vessel by going through the same procedures.

The chemical distribution 118 from the pressure chamber to the end user will start by opening the control valve and adjusting the flow rate through the system. Chemical quality 119 is monitored with an additional monitoring system or the same one for the filling system. The chemical will be recirculated back to the bulk source by opening the re-circulation valves 120 if the quality does not meet the specification. The liquid level 121 in the vessel is also monitored. If the low level is reached, the distribution with another vessel 122 will preferably start. The chemical distribution will continue if the level is neither low nor high. A signal will be sent to the alarm if the level is too low or too high. The flow rate and fluid pressure to each user 127 are monitored and controlled, and the surplus flow is re-circulated back to the bulk source by opening the re-circulation valve 128. If the vessel emptying is necessary, the empty 117 will start by opening the re-circulation valve to either fill the chemical into another vessel or re-circulate back to the bulk source.

Chemical Distribution Cabinet

Even though the components of the chemical delivery system of this invention can spread and scatter in a relatively large space, it is preferred to integrate the whole system with all of the components, except the distribution manifold 69, into a cabinet. This cabinet is used to save space occupied by the system and also for easy control and ease of maintenance.

A preferred embodiment of the delivery cabinet is illustrated in FIG. 8. This cabinet is similar to a household cabinet with many features for this specific purpose. The cabinet 130 preferably comprises front doors 137 and 141, computer 149, vent connection 133 and fans 143 and 145, chemical in and out connections 134, 135, and 136, high pressure gas connection 132, electric inlet 131, connection 148 for sampling, and a floor pallet 139 with a catch pan underneath. Cabinet 130 has handles 138 and 142, two side panels 144 and 146, and a top panel 147. The cabinet can be as high as 10 feet, depending on the overall height of the pressure vessel. The width can be two diameters of the pressure vessel plus the space for the computer, other spaces for piping and valves, and enough margin. The depth of the cabinet can be the diameter of the pressure vessel plus some space for piping and valves. The cabinet material is preferably plastic material such as high density polypropylene, high density polyethylene, and TEFLON. The cabinet is with at least 4 support legs 140 at each corner, preferred 6 legs with the other 2 at the front and back centers. The stainless steel 316L unistruts or angle bars are preferred as the support materials for the cabinet.

The computer and electronic components 149 are installed in one side of the cabinet with monitor illustrated on the front for easy access. The computer monitor can be the size of 5 inches and larger, mounted at one side of the front of the cabinet and 1 foot and more above the ground. This invention prefers the height of about 4 feet above the ground for the operator's convenience. Doors 137 and 141 can be two sliding doors or double swing doors with the transparent plastic material such as the clean PVC. The doors can be a single swing door opened to one side. The connections 131, 132, 134, 135, 136, and 148 can be the openings for letting the chemical tubes or electric wires go through the cabinet walls. The vent connection 133 can be a flange for allowing the cabinet to be connected with any external vent. The fans 143 and 145 are preferably positive pressure blowers with diameter of about 3 inches and installed at both sides of the cabinet near to the bottom. These fans blow toward inside of the cabinet to bring air in as make-up air. These fans can be replaced with small windows to allow air flow in by virtue of the negative pressure of the general vent system.

The pallet with a catch pan 139 inside the cabinet is preferably the size of the cabinet floor with the depth preferred about 4 inches. The material for the catch pan can be any compatible materials, such as PVC, polypropylene, polyethylene, TEFLON, and stainless steel. A sump pump, not shown, can be installed on the floor of the cabinet to remove any leak inside the catch pan. A sink drainage, not shown, instead of the sump pump can be installed to discharge any leak to an external waste chemical container. The sump pump can be a diaphragm pump such as those from YAMADA.

The pressure vessels are preferably set on the floor pallet side by side. The tubes and valves can be mounted on the side or back wall inside the cabinet. Although not illustrated, the chemical in and out tubes are preferably formed from chemical compatible materials, such as polypropylene, polyethylene, and TEFLON, double contained with the clean PVC tube outside to catch any leak.

Various changes and substitutions may be made to the disclosed methods and systems without departing from the scope of the claims which follow. For example, more than one balloon may be present in the interior of each pressure vessel, and different balloons within the same vessel may be inflated with the same or different gases. Such variations need no further explanation and are intended to be within the claims.

What is claimed is:

1. A system for transferring and delivering a liquid chemical from a bulk source to an end use station, the system comprising:

(a) a pressure vessel connected to the bulk source by a delivery conduit, the pressure vessel having an internal surface, the delivery conduit having a pump therein;

(b) a balloon positioned within the pressure vessel, the balloon having an interior and an interior surface and an exterior and an exterior surface;

(c) a space adapted to receive liquid chemical, the space defined by at least a portion of the balloon exterior surface and at least a portion of the pressure vessel internal surface; and (d) means for delivering a pressurized gas into the balloon, whereby upon entrance of the gas into the balloon, the liquid chemical is forced out of the space and to an end use station through a discharge conduit, the balloon connected to the pressure vessel only at a pressurized gas inlet.

2. System in accordance with claim 1 wherein said pressure vessel, balloon, and means for delivering pressurized gas are all controlled by a computer.

3. System in accordance with claim 1 wherein all components are housed in a cabinet.

4. System in accordance with claim 1 wherein more than one pressure vessel and balloon combination are present in parallel flow relation to each other, allowing continuous delivery of the liquid chemical to an end use.

5. System in accordance with claim 1 wherein the delivery conduit includes a first sample port.

6. System in accordance with claim 5, further including a first recirculation conduit connecting the delivery conduit and the bulk source.

7. System in accordance with claim 1 further comprising a second sample port on said discharge conduit.

8. System in accordance with claim 7 further comprising a second recirculation conduit connecting the discharge conduit with said bulk source.

9. System in accordance with claim 1 further comprising a manifold connected to said discharge conduit, said manifold having conduits to multiple end use stations.

10. System in accordance with claim 1 including a third recirculation conduit connecting the end use station to said bulk source.

11. Method of transferring and delivering a liquid chemical from a bulk source to an end use station, the method comprising the steps of:

(a) delivering liquid chemical from a bulk source through a delivery conduit using a pump to a pressure vessel, the pressure vessel having an interior surface;

(b) providing a balloon inside the pressure vessel, the balloon having interior and exterior surfaces, the liquid chemical occupying at least a portion of a space between the pressure vessel interior surface and balloon exterior surface the balloon connected to the pressure vessel only at a pressurized gas inlet; and (c) delivering a gas to the balloon, thereby causing liquid chemical to flow from the space to an end use station through a discharge conduit.

12. Method in accordance with claim 11 including controlling said pressure vessel, said balloon, and said means for delivering pressurized gas by a computer.

13. Method in accordance with claim 11 comprising switching to a second pressure vessel and balloon combination present in parallel flow relation to said pressure vessel, allowing continuous delivery of said liquid chemical to an end use.

14. Method in accordance with claim 11 comprising sampling the liquid chemical flowing through the delivery conduit.

15. Method in accordance with claim 11, comprising recirculating the liquid chemical through a first recirculation conduit connecting the delivery conduit and the bulk source.

16. Method in accordance with claim 11 comprising sampling the liquid chemical flowing through said discharge conduit.

17. Method in accordance with claim 11 comprising recirculating the liquid chemical through a second recirculation conduit connecting the discharge conduit with said bulk source.

18. Method in accordance with claim 11 comprising delivering the liquid chemical through a manifold connected to said discharge conduit, said manifold having conduits to multiple end use stations.

19. Method in accordance with claim 11 comprising recirculating the liquid chemical through a third recirculation conduit connecting the end use station to said bulk source.

* * * * *